March 4, 1969  B. N. SMITH  3,431,025
WELDED SPOKED WHEEL

Original Filed March 26, 1963  Sheet _1_ of 2

BRUCE N. SMITH
INVENTOR.

BY
*Alvan S. Blodgett*

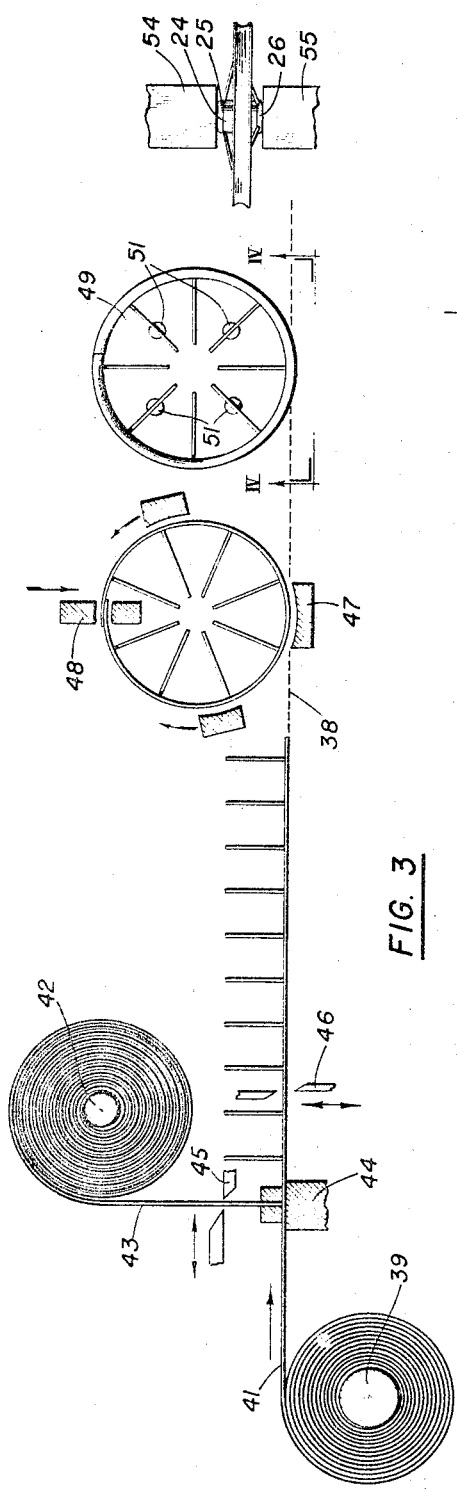
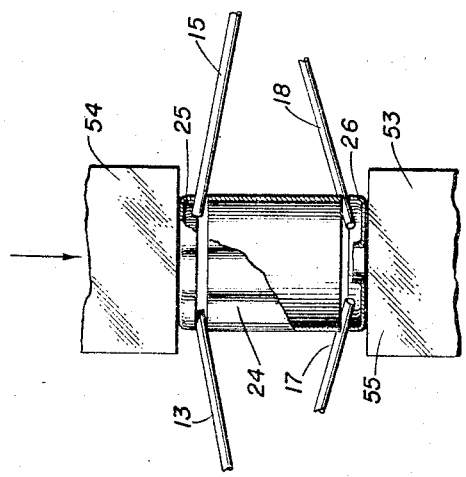
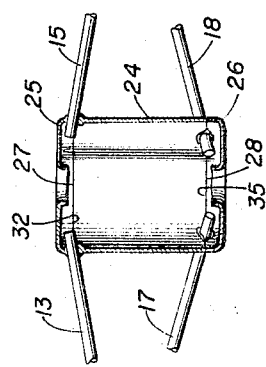
BRUCE N. SMITH
INVENTOR.

United States Patent Office 3,431,025
Patented Mar. 4, 1969

3,431,025
WELDED SPOKED WHEEL
Bruce N. Smith, P.O. Box 197,
Newcastle, N.H. 03854
Continuation of application Ser. No. 535,428, Mar. 18, 1966, which is a division of Ser. No. 268,178, Mar. 26, 1963, now Patent No. 3,251,978, dated May 17, 1966. This application Oct. 9, 1967, Ser. No. 674,013
U.S. Cl. 301—59                         1 Claim
Int. Cl. B60b 1/04

ABSTRACT OF THE DISCLOSURE

A wire spoke wheel of all-welded construction for use with baby carriages or the like. The spokes are welded at their outer ends to an annular rim and at their inner ends to a hub. The hub includes a central tube and a cap having an axially directed flange at each end of the hub. The inner ends of the spokes are positioned and welded between the edges of the caps and the ends of the tube.

---

The application is a continuation of application Ser. No. 535,428, filed Mar. 18, 1966, now abandoned, which was a division of my patent application Ser. No. 268,178, filed on Mar. 26, 1963, now Patent No. 3,251,978 which issued May 17, 1966.

This invention relates to a wheel and, more particularly, to a light-duty wheel for use in a baby carriage or the like.

Wire spoke wheels and their manufacture have not changed appreciably for many years. Generally speaking, a circular rim is formed from sheet metal and is provided with apertures to receive the outer ends of the wire spokes. The outer ends of the spokes are then deformed to lock them in the rim apertures. In most cases the spokes have been formed from U-shaped wire forms, the bight of the form being close to the central hub of the wheel. The hub is provided with finger-like flanges which are bent around the bights of the spokes by a stamping operation to lock the whole assembly together. One of the disadvantages of this type of construction is that it requires a considerable amount of hand labor. The steps of swaging the ends of the spokes in place on the rim and the bending of the hub cap fingers around the bight of the U-shaped spokes are both operations which, because of the irregularity of the wheel, are necessarily done by a hand operation in which the operator places the elements in a machine by hand, thus involving a large number of handling operations. This handling makes the wheel an item which is expensive beyond its complexity. Furthermore, joining the elements by this forging and stamping type of operation results in a wheel which eventually becomes loose and separation of the parts often takes place after a short period of use. These and other difficulties experienced with the prior art devices have been obviated in a novel manner by the present invention.

It is, therefore, an outstanding object of the invention to provide a spoked wheel of strong yet inexpensive construction.

Another object of this invention is the provision of a light-duty spoked wheel of all-welded construction.

With these and other objects in view, as will be apparent to those skilled in the art, the invention resides in the combination of parts set forth in the specification and covered by the claim appended hereto.

Figure 1:
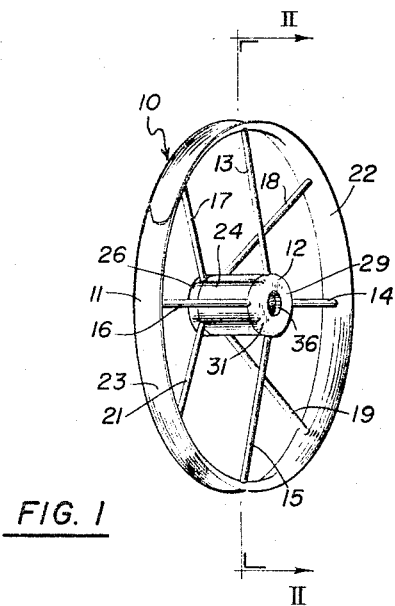
Figure 2:
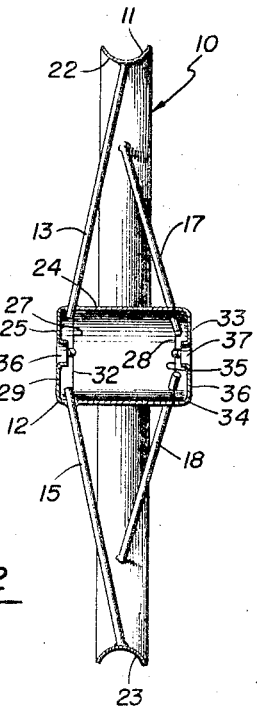
Figure 4:
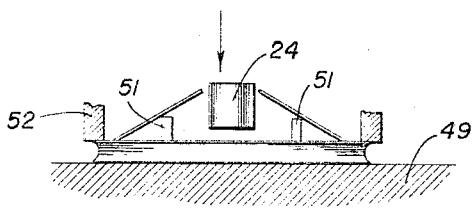

The character of the invention, however, may be best understood by reference to one of its structural forms, as illustrated by the accompanying drawings in which:

FIG. 1 is a perspective view of a wheel embodying the principles of the present invention, FIG. 2 is a sectional view of the wheel taken on the line II—II of FIG. 1, FIG. 3 is a somewhat schematic view illustrating a process and apparatus for producing the wheel, FIG. 4 is a vertical view of the apparatus taken on the line IV—IV of FIG. 3, FIG. 5 is a sectional view of the center of the wheel shown during a step of its manufacture, and FIG. 6 is a sectional view of the center of the wheel showing it after completion.

Referring first to FIGS. 1 and 2, wherein are best shown the general features of the invention, the wheel, indicated generally by the reference numeral 10, is shown as consisting of a rim 11, a hub 12, and eight wire spokes 13, 14, 15, 16, 17, 18, 19, and 21. The rim is an annulus formed of a sheet metal strip which has been rolled to give a circular-segmental cross-sectional form, having an inner convex surface 22 and an outwardly-directed concave surface 23. The spokes are all short lengths of heavy wire whose outer ends are welded to the inner surface 22 of the rim 11. The spokes are welded to the rim at equal intervals around the convex surface 22 along a line which is equi-distant from the two edges of the rim.

The hub 12 consists of a central tubular portion 24 and end hub caps 25 and 26. The tubular portion 24 is located with its axis perpendicular to the central plane of the rim with its exis extending along the axis of the rim annulus and with ends 27 and 28 which are spaced equi-distantly from the central plane of the rim. The hub cap 25 consists of a circular disk 29 which lies in the plane parallel to the central plane of the rim 12. The disk is provided with an axially peripheral flange 41 terminating in an edge 32. The inner ends of the spokes 13, 14, 15, and 16 lie between the edge 27 of the central portion 24 and the edge 32 of the hub cap 25 in a manner which will be described more fully hereinafter. Similarly, the hub cap 26 consists of a circular disk 33 having a peripheral axially-extending flange 34. The flange 34 has an edge 35 which lies against the edge 28 of the central portion 24, the inner ends of the spokes 17, 18, 19, and 21 lying between these two edges. The disk 29 of the hub cap 25 is provided with a central circular aperture 36, while the disk 33 of the hub cap 26 is provided with a similar aperture 37, these apertures being intended to receive an axle.

FIGS. 3 and 4 show the apparatus used for making the wheel and also serve to illustrate the process. The process line 38 is shown as a straight horizontal line, but it will be understood that the sequential steps of the process may be carried out in a circular path or a vertical path. A reel 39 is located at the beginning of the process line 38 and dispenses rim stock 41 in a continuous strip. Overlying the process line is a reel 42 which dispenses spoke wire 43 in a continuous line perpendicular of the process line 38. The rim stock 41 moves along the process line 38 with its convex side 22 facing upwardly toward the oncoming wire. The free end of the wire is pressed against the rim stock. At the same time, a welding apparatus 44 grasps the wire adjacent the free end by means of a clamping electrode and simultaneously presses another electrode against the downwardly-directed concave surface 23 of the rim stock. Current is then passed between the two electrodes through the rim stock and the wire to produce a weld. While the welding is taking place, a shear 45 cuts a length of wire sufficient to provide the spoke. The spoke has by then been welded to the rim stock and the continuous movement of the rim stock carries the spoke onward. After a sufficient pre-determined amount of rim stock has passed, the end of the wire is brought down again to provide another spoke. The welding of the spokes in this manner takes place continuously, so that the rim stock following the welding apparatus carries a plurality of upwardly-extending spokes at suitable intervals. Following the welding apparatus, the rim stock with its spoke appendages passes through a shear 46 which cuts the rim stock midway between two adjacent spokes. This cutting takes place a substantial period of time after the leading end of the rim stock passes through the shear so that a suitable length of rim stock with its attached spokes results. The rim stock next pases into a bending apparatus 47 which forms the rim stock into a complete circle with the free ends overlapping and the spokes extending inwardly. The ends are inserted in a welding apparatus 48 which clamps the free ends together and spot welds them to give a complete circular rim. The rim in this condition is next acted upon by an assembly table 49; this table may be part of an assemblage with the welding apparatus 48 and the bending apparatus 47 or it may be a separate apparatus to which the wheel is moved by an automatic conveyor system. Now, it will be understood that following the spot welding operation (in which the ends of the rim stock are joined together) all spokes extend inwardly in the exact central plane of the rim. The assembly table is provided with a flat horizontal surface from which extends vertical spoke-displacing pins 51. An annular pressure member presses the rim 12 downwardly against the surface of the table and the pins 51 are so located as to contact four of the eight spokes pressing them upwardly at a much steeper angle than they will occupy in the finished wheel. This operation is shown also in FIG. 4. This upward angular movement of four of the spokes not only bends them at an angle to the rim but also creates a large space between their free ends. Into this space is dropped the central tubular portion 24 of the hub. When the pressure member 52 is then released, the upwardly bent spokes spring back against the upward edge 27 of the central portion 24 while the other four spokes rest against the lower edge 28. When the elements are relieved of all pressure, the final result is that the upper spokes do not extend at as great an angle to the central plane of the rim as they did under the action of the pins 51 and the lower spokes are bent from the horizontal to an angularity to the central plane of the rim which is equal to the angularity of the upper spokes. Next, the hub caps 25 and 26 are brought into place in alignment with the central tubular portion 24. The operation of bringing together the three elements of the hub with spokes in between them is shown in FIG. 5 as well as in FIG. 3. The assembled wheel is brought into contact with a welding apparatus 53 having electrodes 54 and 55. The electrodes move together to clamp the hub caps, the central portion, and the spoke ends together. Then, a welding current is passed from the electrode 54 to the electrode 55 in accordance with the usual practice. The current enters the upper hub cap, passes through its flange, through the portion of the upper spokes touching the flange, through the central tubular portion, through the lower spokes, into the flange of the lower hub cap, and out into the lower electrode 55. By the process of resistance welding the greatest amount of heat will be generated in the spoke ends, in the portions of the flanges of the hub caps which contact the spoke ends, and in the portions of the ends of the central tubular portion which contact the spoke ends. This is because the spoke wire is substantially cylindrical and gives theoretical line contact between its free end and those surfaces of the flanges and central tubular portion. The result of this action is a fusion of the spoke ends, flange, and central tubular portion with a certain amount of pressing of excess molten metal inwardly and outwardly of the hub. The result is shown in FIG. 6. The pressure of the electrodes 54 and 55 plus the blending and melting of the metal around the spoke ends brings the hub caps and the central portion together so that the edge 32 of the hub cap 25 contacts the upper edge 27 of the central portion 24. Furthermore, the edge 35 of the hub cap 26 contacts the edge 28 of the central portion. The excess metal is squeezed inwardly of the hub and outwardly to a slight extent, thus providing a slight fillet at the junction of the inner ends of the spokes with the hub.

It can be seen, then, that the wheel, according to the present invention, is very strong for its size and for the simplicity of its components. All of the joints are welded in such a way as to provide a very sturdy construction. It is particularly noteworthy that the hub is an almost perfect cylinder with no detailed appendages and the method of welding the spokes to the hub results in a smooth filleting action construction between the spokes and the hub. This makes it easy to paint and also assures that there are no sharp interior corners which will permit the accumulation of water and rusting with resultant failure.

By making the wheel according to the process of the invention, it can be seen that it is possible to produce a wheel of superior performance and at the same time produce it more economically than by prior art methods. The steps of applying the spokes to a continuous strip of rim stock, of cutting the rim stock into short lengths, of forming the rim stock into a circle with the spokes extending inwardly, of welding the overlapping free ends, of expanding the free ends of the spokes to permit the insertion of the central portion of the hub, of the application of the hub caps, and of the pressure resistance welding technique for uniting the hub cap central potrion and spokes are all method steps which lend themselves to continuous straight-line manufacture with a minimum of labor and handling costs.

It can be seen also that the apparatus provides a novel manner of carrying out the process for producing the wheel of the invention. The inter-relationship of the welding equipment and shears along with the bending apparatus, assembling apparatus, and final welding apparatus lends itself to an inexpensive, continuous production of the invention.

The invention having been thus described, what is claimed as new and desired to secure by Letters Patent, is:

1. A wheel, comprising
 (a) an annular rim formed from a strip of sheet metal with a circular-segmental cross-section with an inwardly-directed convex surface and an outwardly-directed concave surface,
 (b) spokes extending inwardly from the rim, each spoke consisting of a length of wire which is welded at its outer end to the rim,
 (c) a central sheet metal tube having an axis extending perpendicular to the general plane of the rim, and
 (d) a sheet metal cap at each end of the tube, each cap having an axially-extending flange whose edge lies adjacent to the edge of the corresponding end of the tube, the inner ends of the spokes being welded to the tube and cap between the contacting edges of the central tube and the caps, each cap having a central aperture with an axially-directed flange around it extending in the same direction as the flange for receiving a straight rod-like axle and acting as a bearing for it.

References Cited
UNITED STATES PATENTS

| | | |
|---|---|---|
| 452,840 | 5/1891 | Hall. |
| 478,643 | 7/1892 | Scott. |
| 948,998 | 2/1910 | Lachman. |
| 1,452,036 | 4/1923 | Fulda. |
| 1,499,140 | 6/1924 | Austin. |

RICHARD J. JOHNSON, *Primary Examiner.*